Dec. 7, 1943.   H. D. MATTHEWS   2,336,408
THERMOSTAT
Filed Sept. 30, 1940
Fig.1
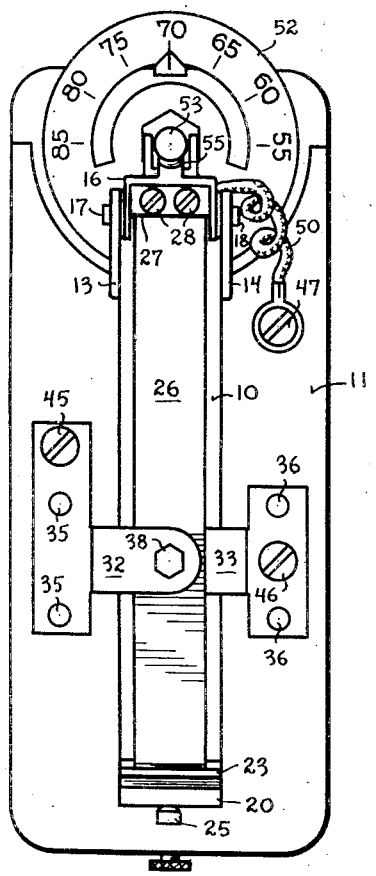
Fig.2
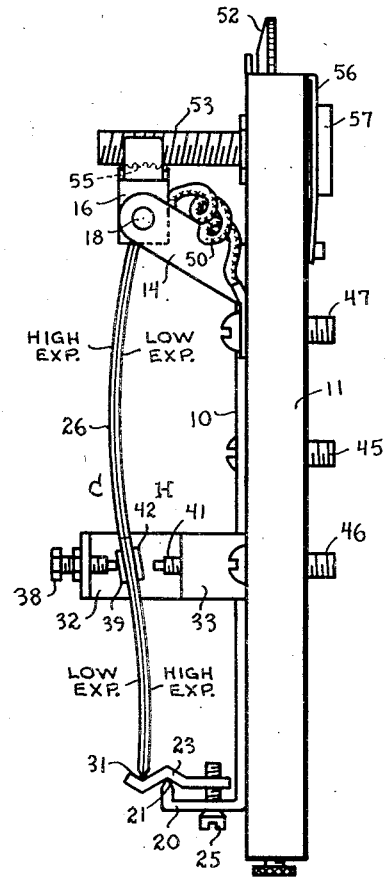
Fig.3
INVENTOR
Howard D. Matthews
BY George H. Fisher
ATTORNEY Patented Dec. 7, 1943

2,336,408

UNITED STATES PATENT OFFICE 2,336,408

THERMOSTAT

Howard D. Matthews, Minneapolis, Minn., assignor to Minneapolis-Honeywell Regulator Company, Minneapolis, Minn., a corporation of Delaware Application September 30, 1940, Serial No. 358,997

12 Claims. (Cl. 200—139)

The present invention relates to thermostatic devices and more particularly to a thermostat employing a temperature responsive element of the bimetal or equivalent type.

One of the objects of the invention is to provide a thermostatic device employing a bimetal element adapted to operate with a snap action.

Another object is to provide a snap acting thermostat having a minimum number of parts.

Another object of the invention is to provide a thermostat employing a bimetal element made up of oppositely deflecting portions.

Further objects will appear in the following description taken in conjunction with the various figures of the drawing in which:

Figure 1 is a front view of a thermostat embodying the invention;

Figure 2 is a side view of the thermostat shown in Figure 1, and

Figure 3 is an enlarged longitudinal section of the bimetal element employed in the thermostat of Figures 1 and 2.

It has previously been proposed to provide a thermostat in which a bimetal element is stressed to obtain a snap action, the element being a uniform piece of bimetal throughout its length which is pivoted at its two ends. Such a construction, however, gives rise to a high differential since the element is in the shape of an arch on either side of dead center, and a relatively great bending force is necessary to collapse the arch and cause the element to assume a shape involving a compound curve in going over dead center. The present invention overcomes the above difficulties by employing a bimetal element having portions which are oppositely deflecting on changes in temperature and which assist one another in producing the force necessary to drive the element past its dead center position. While an arch is formed by at least one of the portions of the element, it is not necessary that the arch be collapsed in order for the element to snap from one position to another because the other portion will deflect in the opposite direction and the element as a whole will assume an S shape which will travel readily past dead center position.

As seen in Figures 1 and 2, the thermostat is shown as being of the type adapted to be mounted on a wall and respond to the temperature of a space. A bracket 10 is suitably secured to an insulating base member 11, which base member is adapted to be secured to a terminal wall plate (not shown) which may be of the type shown in the patent to Kronmiller et al. 2,171,272. At its upper end bracket 10 is provided with a pair of upstanding supports 13 and 14. A block 16 is provided with a pair of trunnions 17 and 18 which pass through openings in the two supports 13 and 14 to provide a pivot for the block 16. The lower end 20 of the bracket 10 is bent forwardly and upwardly to form a knife edge 21 which serves as a pivot about which an adjusting member 23 may be rotated. A screw 25 passes through the lower portion 20 of the bracket 10 and into the adjusting member 23 for calibrating the thermostat as will be hereinafter described.

A bimetal element 26 is rigidly secured to the block 16 by means of a clamping plate 27 and a pair of screws 28. It will be noted that the element 26 is free to flex below the axis of the trunnions 17—18. The lower end of the bimetal element 26 is pivoted in the adjusting member 23 in a knife-edge pivot 31. In order that the thermostat may operate with a snap action the adjusting member 23 is positioned by the screw 25 to compress the element 26 longitudinally producing a curve in the element as will be hereinafter described.

The bimetal element is shown in somewhat enlarged form in Figure 3. It will be noted that intermediate its ends the side on which the high expansion material is located is reversed. Thus the high expansion material is on the lower side at the left of Figure 3 and on the upper side at the right of Figure 3. While the element 26 is shown as being straight it is usually preformed to assume a curved shape at room temperatures in order to attain the desired operating characteristics. In the form illustrated the two ends of the bimetal element are welded together but any suitable means may be employed such as riveting for joining the two ends.

Also mounted on the base 11 is a pair of contact mounting brackets 32 and 33. Bracket 32 is secured to the base 11 by means of a pair of rivets 35 while the bracket 33 is secured to base 11 by means of a pair of rivets 36. A contact screw 38 is adjustable in the bracket 32 and is adapted to engage a contact 39 carried by the bimetal element 26. The contact screw 38 forms the "cold" contact of the thermostat. Likewise, a contact screw 41 extends outwardly through the bracket 33 to engage a contact 42 mounted on the bimetal element 26 on the side thereof opposite the contact 39. The contact screw 41 forms the "hot" contact of the thermostat.

The base 11 is secured to a suitable terminal wall plate as shown in the aforementioned Kronmiller et al. patent by means of three terminal screws. Terminal screws 45 and 46 serve to make electrical contact with the brackets 32 and 33, respectively, and hence with the contacts 38 and 41. A terminal srew 47 is connected with the bimetal element by means of a flexible wire 50 which is suitably secured at its opposite end to the block 16 to which the upper end of the bimetal element 26 is secured.

In order to provide an adjustment for the control point of the thermostat, a dial 52 preferably of insulating material is pivoted in the base 11. The dial 52 serves to rotate a screw 53 which engages a gear segment 55 formed integrally with the block 16 to which the upper end of the bimetal element 26 is secured. Obviously, rotation of the dial 52 will cause rotation of the block 16 about the axis formed by the trunnions 17 and 18 in the supports 13 and 14. A resilient washer 56 engages a bushing 57 carried behind the base 11 which rotates with the dial 52 and the screw 53 and serves to maintain them in any one of their adjusted positions. The dial 52 is provided with suitable indicia indicating the temperature at which the thermostat will respond.

In the illustrative embodiment of the invention the bimetal element 26 which has oppositely deflecting portions is compressed slightly by means of the screw 25 and the member 23 so that the bimetal element assumes a curved shape as shown in Figure 2. The deformation as illustrated is somewhat exaggerated as is the thickness of the element. As shown, the thermostat is in its "cold" position with the contact 39 in engagement with the contact screw 38. As the temperature of the bimetal element is raised, the lower end of the upper portion of the element will tend to deflect toward the right as seen in Figure 2 and this will tend to move the contacts 39—42 toward the right. The lower portion of the bimetal element being oppositely deflecting also tends to move the contacts 39—42 to the right. As the lower portion of the thermostatic element is heated it will acquire a curved form and since the lower extremity pivots in the knife edge 31 the angle of the upper end of this lower portion with respect to the base must change. In order for this angle to change, the lower end of the upper portion of the element must assume this same angle with respect to the base thus creating a force tending to move the central portion of the element as a whole to its "hot" position in which the movable contact 42 engages the stationary contact 41. When the temperature is reduced the two portions of the element similarly act to supply a force to return the element to its "cold" position as illustrated. Because both parts of the element assist in the action of the device it will also operate, but with somewhat reduced efficiency, if only one of the portions of the element is of thermostatic material.

As previously mentioned the adjusting member 23 is positioned by the screw 25 to compress the element 26. The block 16 is adjusted so that a compressive force on the element 26 will bend it toward the left as seen in Figure 2 and the contact 39 abuts the contact 38 to impart an S shape to the element. As the temperature increases the upper and lower portions of the element 26 unite in building up a force tending to move the movable contacts toward the right. This force is opposed by the longitudinal compressive force on the element holding it in the position shown. At a predetermined relatively high temperature, the force due to flexure of the bimetal will exceed the lateral force due to the compression of the element and movement toward the right will occur. The magnitude of both of these forces will decrease as the element 26 moves toward the right, but the force due to the longitudinal compression of the element will decrease at a greater rate than the force due to the lateral flexure of the bimetal and the element will move to the right with a snap action. If the element goes "over-center" the force due to the longitudinal compression will reverse after a straight movement and begin to assist the element in moving to its "hot" position.

Now let us assume the element to be in its "hot" position and the temperature starts to fall. If the element has gone "over-center" in moving to this position it will start to move toward the left when the lateral force due to flexure of the bimetal equals the opposing lateral force due to the longitudinal compression of the element. Once movement is started the force due to compression of the element will decrease at a greater rate than the force due to flexure of the bimetal and the element will move to the left with a snap action. If the device is so adjusted that the element 26 does not move "over-center" but is held to the left of it by the contact 41, movement toward the left from the "hot" position will commence when the lateral force due to flexure of the bimetal tending to hold the element toward the right becomes less than the lateral force due to longitudinal compression of the element tending to move the element to the left. The force due to the compression of the element will increase at a greater rate than the force due to bending of the bimetal and the element will move to its "cold" or left-hand position with a snap action.

Adjustment of the screw 25 which determines the longitudinal force on the element 26 serves to determine the operating differential of the thermostat. As a greater upward force is applied at the pivot 31, the operating differential will increase.

The illustrative embodiment of the invention is not to be considered as the only form which the invention might take. Other forms equally useful will be apparent to those skilled in the art and I am to be limited only by the scope of the appended claims.

I claim as my invention:

1. In a thermostatic device, in combination, an elongated thermostatic element comprising a pair of portions which are adapted to deflect laterally on changes in temperature, said portions being jointed end to end so as to deflect in opposite directions, a pair of supports for restraining the two ends of said element from lateral movement and for compressing said element longitudinally, whereby a change in temperature of said element changes its internal stresses so as to produce a lateral snap action of an intermediate portion thereof, and control means adapted to be actuated by lateral movement of a portion of said element intermediate the ends thereof.

2. In a thermostatic device, in combination, an elongated thermostatic element comprising a pair of portions which are adapted to deflect laterally on changes in temperature, said portions being jointed end to end so as to deflect in opposite directions, a pair of supports for restraining the two ends of said element from movement and for compressing said element longitudinally, whereby a change in temperature of said element changes its internal stresses so as to produce a lateral snap action of an intermediate portion thereof, and control means adapted to be actuated by lateral movement of a portion of said element intermediate the ends thereof.

3. In a thermostatic device, in combination, an elongated thermostatic element comprising a pair of oppositely deflecting portions joined end to end, supporting means for securing a first end of said element in a fixed position and a stationary pivot for the second end of said element, said supporting means and said pivot normally maintaining said element in a flexed condition.

4. In a thermostatic device, in combination, an elongated thermostatic element comprising a pair of oppositely deflecting portions joined end to end, supporting means for securing a first end of said element in a fixed position, a stationary pivot for the second end of said element, said supporting means and said pivot normally maintaining said element in a flexed position, and a pair of spaced stops intermediate the ends of said element for limiting transverse movement of the intermediate portion of said element to a predetermined range.

5. In a thermostatic device, in combination, an elongated thermostatic element comprising a pair of oppositely deflecting portions joined end to end, supporting means for securing a first end of said element in a fixed position, a stationary pivot for the second end of said element, said supporting means and said pivot normally maintaining said element in a flexed position, and a stop intermediate the ends of said element for limiting transverse movement of the intermediate portion of said element in one direction.

6. In a thermostat, in combination, an elongated bimetal element a first end of which normally is held in a fixed position, said bimetal element being reversed intermediate its ends so that the high expansion metal is on opposite sides of said element at the two ends thereof, a stationary pivot for the second end of said element, means for compressing said bimetal element longitudinally, and a pair of stops intermediate the ends of said bimetal element for limiting transverse movement of the intermediate portion of said element to a predetermined range, at least one of said stops comprising an electrical contact.

7. In a thermostatic device, in combination, a base member, an elongated thermostatic element comprising a pair of oppositely deflecting portions joined end to end, supporting means for securing a first end of said element to said base, a pivot means in said base for the second end of said element, said supporting means and said pivot means normally maintaining said element in a flexed condition, and means for adjusting the position of one of said first named means on said base to vary the distance between said pivot means and said supporting means.

8. In a thermostatic device, in combination, a base member, an elongated thermostatic element comprising a pair of oppositely deflecting portions joined end to end, supporting means for securing a first end of said element in fixed relation to said base, a pivot in said base for the second end of said element, said supporting means and said pivot normally maintaining said element in a flexed position, and means for angularly positioning said supporting means relative to said base member to vary the operating temperature of the device.

9. In a thermostatic device, in combination, an elongated thermostatic element including a pair of oppositely deflecting portions joined end to end, supporting means for securing a first end of said element in a fixed position, and a relatively stationary pivot for the second end of said element, said supporting means and said pivot normally maintaining said element in a flexed condition.

10. In a thermostatic device, in combination, an elongated thermostatic element of which a portion consists of a pair of oppositely deflecting portions joined end to end, supporting means for securing a first end of said element in a fixed position, and a stationary pivot for the second end of said element, said supporting means and said pivot normally maintaining said element in a flexed condition.

11. In a thermostatic device, in combination, an elongated thermostatic element comprising a pair of oppositely deflecting portions, supporting means for securing a first end of said element in a fixed position, and a stationary pivot for the second end of said element, said supporting means and said pivot normally maintaining said element in a flexed condition.

12. In a thermostatic device, in combination, an elongated element having first and second portions, said first and second portions being oppositely curved, said first portion being adapted to flex laterally on temperature changes, means fixedly supporting one end of said first portion, means pivotally supporting one end of said second portion, the other ends of said portions being integrally joined together to form a single unit, said supporting means maintaining said first and second portions in said curved condition, and stop means limiting the movement of said second portion by said first portion, the curvature of said first and second portions being irreversible as said second portion is moved by said first portion.

HOWARD D. MATTHEWS.